United States Patent Office 3,080,389
Patented Mar. 5, 1963

3,080,389
16-FORMYL-16-ANDROSTENES
Albert Bowers and Percy George Holton, Mexico City, Mexico, assignors to Syntex Corporation, a corporation of Panama
No Drawing. Filed Aug. 31, 1961, Ser. No. 135,156
21 Claims. (Cl. 260—397.3)

The present invention relates to novel cyclopentanophenanthrene derivatives and to a process for the production thereof.

More particularly the present invention relates to novel derivatives of 16-formyl-$\Delta^{16}$-androstene.

The novel compounds of the present invention are represented by the following formulas:

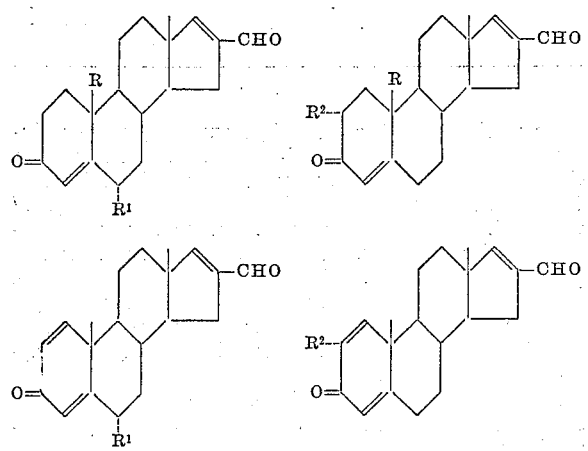

In the above formulas, R represents hydrogen or methyl; $R^1$ represents fluorine, chlorine or methyl and $R^2$ represents hydrogen or methyl. $R^1$ and $R^2$ may also be lower alkyl.

The compounds represented by the above formulas are anti-androgenic agents. Further, they exhibit anti-estrogenic and anti-gonadotrophic activities and lower the blood cholesterol level. They also are appetite stimulants and anti-progestational agents.

The novel compounds of the present invention are prepared by the process illustrated by the following equation:

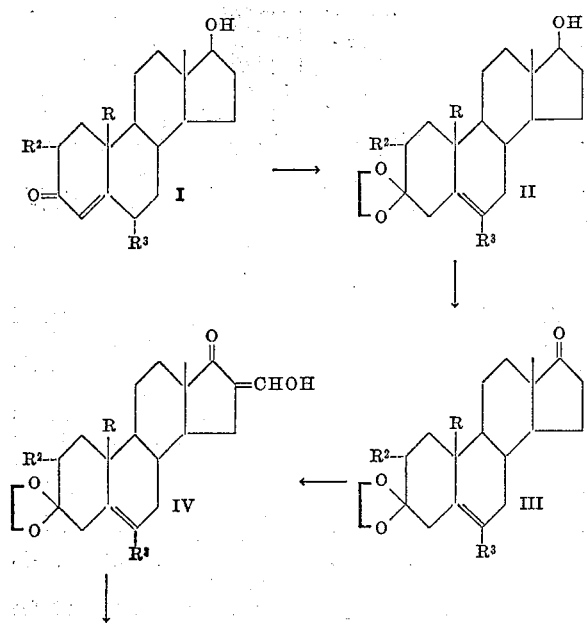

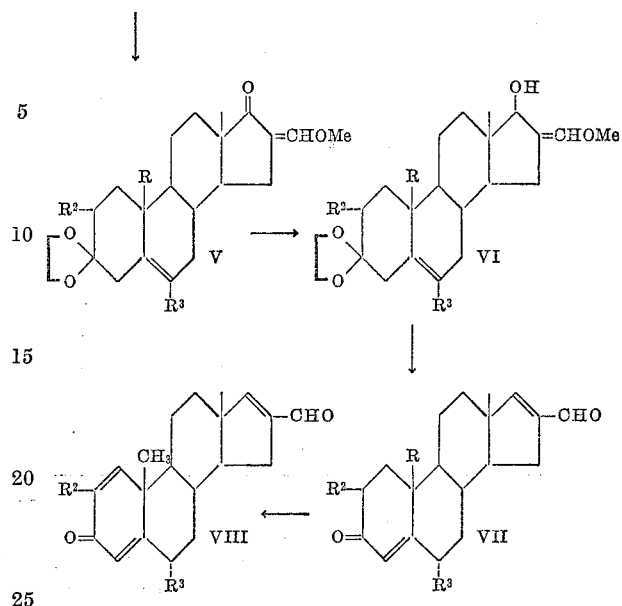

In the above formulas, R and $R^2$ have the same meaning as heretofore set forth; $R^3$ may be hydrogen, fluorine, chlorine or methyl. When $R^2$ is methyl, $R^3$ is hydrogen and when $R^3$ is fluorine, chlorine or methyl, $R^2$ is hydrogen.

In practicing the process outlined above, the starting testosterone derivative (I) or the corresponding 19-nor compound is treated with ethylene glycol in an acid medium thus affording the corresponding 3-cycloethylenedioxy-$\Delta^5$-androstene derivative (II). Oxidation of the 17$\beta$-hydroxyl group preferably with chromium trioxidepyridine, furnishes the 17-ketone (III) which upon treatment with ethyl formate in the presence of an alkali metal hydride, such as sodium hydride, and subsequent reaction of the formed metal salt in an acid medium, affords the corresponding 16-hydroxymethylene-3 - cycloethylenedioxy-$\Delta^5$-androstene-17-one derivative (IV).

Methylation of the 16-hydroxymethylene group with a suitable agent such as diazomethane, furnishes the corresponding 16-methoxymethylene derivative (V). Reduction of the 17-keto group of this compound, preferably with sodium borohydride, affords the corresponding 17$\beta$-hydroxy-16-methoxymethylene-3-cycloethylenedioxy - $\Delta^5$-androstene derivative (VI) which upon treatment in a mild acid medium furnishes the respective 16-formyl-$\Delta^{4,16}$-androstadien-3-one compound (VII) or the corresponding 19-nor derivative.

The 16-formyl-$\Delta^{4,16}$-androstadiene compounds containing the methyl group at C-10 (VII; R=CH$_3$), upon treatment with a suitable dehydrogenating agent such as 2,3-dichloro-5,6-dicyano-1,4 - benzoquinone, affords the corresponding 16-formyl-$\Delta^{1,4,16}$-androstatriene compounds (VIII).

The following specific examples serve to illustrate, but are not intended to limit the scope of the present invention:

*Example I*

A mixture of 5 g. of testosterone, 150 cc. of anhydrous benzene, 60 cc. of ethylene glycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3-cycloethylenedioxy-Δ⁵-androsten-17β-ol.

Following the same technique, there were treated the starting compounds hereinafter listed, thus affording the corresponding products set forth below.

| Starting compounds | Products |
|---|---|
| 19-nor-testosterone | 3-cycloethylenedioxy-19-nor-Δ⁵-androsten-17β-ol. |
| 2α-methyl-testosterone | 2α-methyl-3-cycloethylenedioxy-Δ⁵-androsten-17β-ol. |
| 2α-methyl-19-nor-testosterone | 2α-methyl-3-cycloethylenedioxy-19-nor-Δ⁵-androsten-17β-ol. |
| 6α-fluoro-testosterone | 6α-fluoro-3-cycloethylenedioxy-Δ⁵-androsten-17β-ol. |
| 6α-fluoro-19-nor-testosterone | 6α-fluoro-3-cycloethylenedioxy-19-nor-Δ⁵-androsten-17β-ol. |
| 6α-chloro-testosterone | 6α-chloro-3-cycloethylenedioxy-Δ⁵-androsten-17β-ol. |
| 6α-chloro-19-nor-testosterone | 6α-chloro-3-cycloethylenedioxy-19-nor-Δ⁵-androsten-17β-ol. |
| 6α-methyl-testosterone | 6α-methyl-3-cycloethylenedioxy-Δ⁵-androsten-17β-ol. |
| 6α-methyl-19-nor-testosterone | 6α-methyl-3-cycloethylenedioxy-19-nor-Δ⁵-androsten-17β-ol. |

*Example II*

A solution of 4 g. of 3-cycloethylenedioxy-Δ⁵-androsten-17β-ol in 80 cc. of pyridine was added to a mixture of 4 g. of chromic trioxide in 80 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3-cycloethylenedioxy-Δ⁵-androsten-17-one.

By the same procedure there were oxidized the starting compounds set forth below, thus furnishing the corresponding products hereinafter listed:

| Starting compounds | Products |
|---|---|
| 3-cycloethylenedioxy-19-nor-Δ⁵-androsten-17β-ol. | 3-cycloethylenedioxy-19-nor-Δ⁵-androsten-17-one. |
| 2α-methyl-3-cycloethylenedioxy-Δ⁵-androsten-17β-ol. | 2α-methyl-3-cycloethylenedioxy-Δ⁵-androsten-17-one. |
| 2α-methyl-3-cycloethylenedioxy-19-nor-Δ⁵-androsten-17β-ol. | 2α-methyl-3-cycloethylenedioxy-19-nor-Δ⁵-androsten-17-one. |
| 6α-fluoro-3-cycloethylenedioxy-Δ⁵-androsten-17β-ol. | 6α-fluoro-3-cycloethylenedioxy-Δ⁵-androsten-17-one. |
| 6α-fluoro-3-cycloethylenedioxy-19-nor-Δ⁵-androsten-17-one. | 6α-fluoro-3-cycloethylenedioxy-19-nor-Δ⁵-androsten-17-one. |
| 6α-chloro-3-cycloethylenedioxy-Δ⁵-androsten-17β-ol. | 6α-chloro-3-cycloethylenedioxy-Δ⁵-androsten-17-one. |
| 6α-chloro-3-cycloethylenedioxy-19-nor-Δ⁵-androsten-17β-ol. | 6α-chloro-3-cycloethylenedioxy-19-nor-Δ⁵-androsten-17-one. |
| 6α-methyl-3-cycloethylenedioxy-Δ⁵-androsten-17β-ol. | 6α-methyl-3-cycloethylenedioxy-Δ⁵-androsten-17-one. |
| 6α-methyl-3-cycloethylenedioxy-19-nor-Δ⁵-androsten-17β-ol. | 6α-methyl-3-cycloethylenedioxy-19-nor-Δ⁵-androsten-17-one. |

*Example III*

To a solution of 3 g. of 3-cycloethylenedioxy-Δ⁵-androsten-17-one in 80 cc. of anhydrous benzene was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in aqueous tartaric acid and stirred at room temperature for half an hour. The precipitate was collected, washed with water and dried. Recrystallization from methylene chloride-hexane gave 16-hydroxymethylene-3-cycloethylenedioxy-Δ⁵-androsten-17-one.

The starting compounds listed below were treated following the above described procedure furnishing the corresponding products hereafter set forth.

| Starting compounds | Products |
|---|---|
| 3-cycloethylenedioxy-19-nor-Δ⁵-androsten-17-one. | 16-hydroxymethylene-3-cycloethylenedioxy-19-nor-Δ⁵-androsten-17-one. |
| 2α-methyl-3-cycloethylenedioxy-Δ⁵-androsten-17-one. | 16-hydroxymethylene-2α-methyl-3-cycloethylenedioxy-Δ⁵-androsten-17-one. |
| 2α-methyl-3-cycloethylenedioxy-19-nor-Δ⁵-androsten-17-one. | 16-hydroxymethylene-2α-methyl-3-cycloethylenedioxy-19-nor-Δ⁵-androsten-17-one. |
| 6α-fluoro-3-cycloethylenedioxy-Δ⁵-androsten-17-one. | 16-hydroxymethylene-6α-fluoro-3-cycloethylenedioxy-Δ⁵-androsten-17-one. |
| 6α-fluoro-3-cycloethylenedioxy-19-nor-Δ⁵-androsten-17-one. | 16-hydroxymethylene-6α-fluoro-3-cycloethylenedioxy-19-nor-Δ⁵-androsten-17-one. |
| 6α-chloro-3-cycloethylenedioxy-Δ⁵-androsten-17-one. | 16-hydroxymethylene-6α-chloro-3-cycloethylenedioxy-Δ⁵-androsten-17-one. |
| 6α-chloro-3-cycloethylenedioxy-19-nor-Δ⁵-androsten-17-one. | 16-hydroxymethylene-6α-chloro-3-cycloethylenedioxy-19-nor-Δ⁵-androsten-17-one. |
| 6α-methyl-3-cycloethylenedioxy-Δ⁵-androsten-17-one. | 16-hydroxymethylene-6α-methyl-3-cycloethylenedioxy-Δ⁵-androsten-17-one. |
| 6α-methyl-3-cycloethylenedioxy-19-nor-Δ⁵-androsten-17-one. | 16-hydroxymethylene-6α-methyl-3-cycloethylenedioxy-19-nor-Δ⁵-androsten-17-one. |

*Example IV*

To a solution of 3 g. of 16-hydroxymethylene-3-cycloethylenedioxy-Δ⁵-androsten-17-one in 50 cc. of methylene chloride were added an excess of diazomethane in ether (obtained from nitrosomethylurea) and a few drops of methanol. The reaction mixture was kept at room temperature for 18 hours. The excess reagent was decomposed with acetic acid. The resulting mixture was poured into water, the organic layer washed to neutral and evaporated to dryness. Recrystallization from acetone-hexane afforded the 16-methoxymethylene-3-cycloethylenedioxy-Δ⁵-androsten-17 one.

Following the same technique, there were treated the starting compounds hereafter listed, yielding the products set forth below:

| Starting compounds | Products |
|---|---|
| 16-hydroxymethylene-3-cycloethylenedioxy-19-nor-Δ⁵-androsten-17-one. | 16-methoxymethylene-3-cycloethylenedioxy-19-nor-Δ⁵-androsten-17-one. |
| 16-hydroxymethylene-2α-methyl-3-cycloethylenedioxy-Δ⁵-androsten-17-one. | 16-methoxymethylene-2α-methyl-3-cycloethylenedioxy-Δ⁵-androsten-17-one. |
| 16-hydroxymethylene-2α-methyl-3-cycloetyhlenedioxy-19-nor-Δ⁵-androsten-17-one. | 16-methoxymethylene-2α-methyl-3-cycloethylenedioxy-19-nor-Δ⁵-androsten-17-one. |
| 16-hydroxymethylene-6α-fluoro-3-cycloethylenedioxy-Δ⁵-androsten-17-one. | 16-methoxymethylene-6α-fluoro-3-cycloethylenedioxy-Δ⁵-androsten-17-one. |
| 16-hydroxymethylene-6α-fluoro-3-cycloethylenedioxy-19-nor-Δ⁵-androsten-17-one. | 16-methoxymethylene-6α-fluoro-3-cycloethylenedioxy-19-nor-Δ⁵-androsten-17-one. |
| 16-hydroxymethylene-6α-chloro-3-cycloethylenedioxy-Δ⁵-androsten-17-one. | 16-methoxymethylene-6α-chloro-3-cycloethylenedioxy-Δ⁵-androsten-17-one. |
| 16-hydroxymethylene-6α-chloro-3-cycloethylenedioxy-19-nor-Δ⁵-androsten-17-one. | 16-methoxymethylene-6α-chloro-3-cycloethylenedioxy-19-nor-Δ⁵-androsten-17-one. |
| 16-hydroxymethylene-6α-methyl-3-cycloethylenedioxy-Δ⁵-androsten-17-one. | 16-methoxymethylene-6α-methyl-3-cycloethylenedioxy-Δ⁵-androsten-17-one. |
| 16-hydroxymethylene-6α-methyl-3-cycloethylenedioxy-19-nor-Δ⁵-androsten-17-one. | 16-methoxymethylene-6α-methyl-3-cycloethylenedioxy-19-nor-Δ⁵-androsten-17-one. |

*Example V*

A solution of 1 g. of sodium borohydride in 3 cc. of water was added to an ice-cooled solution of 1 g. of 16-methoxymethylene-3-cycloethylenedioxy-Δ⁵-androsten-17-one, in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract washed with water, dried and evaporated. The solid residue was purified by crystallization from acetone-hexane to give 16-methoxymethylene-3-3-cycloethylenedioxy-Δ⁵-androsten-17β-ol.

Following the same procedure, there were treated the starting compounds listed below, affording the corresponding products hereinafter set forth:

| Starting compounds | Products |
| --- | --- |
| 16-methoxymethylene-3-cyclo-ethylenedioxy-19-nor-Δ⁵-androsten-17-one. | 16-methoxymethylene-3-cyclo-ethylenedioxy-19-nor-Δ⁵-androsten-17β-ol. |
| 16-methoxymethylene-2α-methyl-3-cycloethylenedioxy-Δ⁵-androsten-17-one. | 16-methoxymethylene-2α-methyl-3-cycloethylenedioxy-Δ⁵-androsten-17β-ol. |
| 16-methoxymethylene-2α-methyl-3-cycloethylenedioxy-19-nor-Δ⁵-androsten-17-one. | 16-methoxymethylene-2α-methyl-3-cycloethylenedioxy-19-nor-Δ⁵-androsten-17β-ol. |
| 16-methoxymethylene-6α-fluoro-3-cycloethylenedioxy-Δ⁵-androsten-17-one. | 16-methoxymethylene-6α-fluoro-3-cycloethylenedioxy-Δ⁵-androsten-17β-ol. |
| 16-methoxymethylene-6α-fluoro-3-cycloethylenedioxy-19-nor-Δ⁵-androsten-17-one. | 16-methoxymethylene-6α-fluoro-3-cycloethylenedioxy-19-nor-Δ⁵-androsten-17β-ol. |
| 16-methoxymethylene-6α-chloro-3-cycloethylenedioxy-Δ⁵-androsten-17-one. | 16-methoxymethylene-6α-chloro-3-cycloethylenedioxy-Δ⁵-androsten-17β-ol. |
| 16-methoxymethylene-6α-chloro-3-cycloethylenedioxy-19-nor-Δ⁵-androsten-17-one. | 16-methoxymethylene-6α-chloro-3-cycloethylenedioxy-19-nor-Δ⁵-androsten-17β-ol. |
| 16-methoxymethylene-6α-methyl-3-cycloethylenedioxy-Δ⁵-androsten-17-one. | 16-methoxymethylene-6α-methyl-3-cycloethylenedioxy-Δ⁵-androsten-17β-ol. |
| 16-methoxymethylene-6α-methyl-3-cycloethylenedioxy-19-nor-Δ⁵-androsten-17-one. | 16-methoxymethylene-6α-methyl-3-cycloethylenedioxy-19-nor-Δ⁵-androsten-17β-ol. |

*Example VI*

A solution of 500 mg. of 16-methoxymethylene-3-cycloethylenedioxy-Δ⁵-androsten-17β-ol in 25 cc. of acetone was treated with 0.1 cc. of concentrated hydrochloric acid and the mixture was kept at room temperature overnight. It was then poured into water, extracted with methylene chloride, and the organic extract washed with water to neutral, dried over anhydrous sodium sulfate and evaporated to dryness. Crystallization from acetone-hexane gave 16-formyl-$\Delta^{4,16}$-androstadien-3-one.

The starting compounds listed below were treated by the same procedure affording the corresponding products hereinafter disclosed:

| Starting compounds | Products |
| --- | --- |
| 16-methoxymethylene-3-cyclo-ethylenedioxy-19-nor-Δ⁵-androsten-17β-ol. | 16-formyl-19-nor-$\Delta^{4,16}$-androstadien-3-one. |
| 16-methoxymethylene-2α-methyl-3-cycloethylenedioxy-Δ⁵-androsten-17β-ol. | 16-formyl-2α-methyl-$\Delta^{4,16}$-androstadien-3-one. |
| 16-methoxymethylene-2α-methyl-3-cycloethylenedioxy-19-nor-Δ⁵-androsten-17β-ol. | 16-formyl-2α-methyl-19-nor-$\Delta^{4,16}$-androstadien-3-one. |
| 16-methoxymethylene-6α-fluoro-3-cycloethylenedioxy-Δ⁵-androsten-17β-ol. | 16-formyl-6α-fluoro-$\Delta^{4,16}$-androstadien-3-one. |
| 16-methoxymethylene-6α-fluoro-3-cycloethylenedioxy-19-nor-Δ⁵-androsten-17β-ol. | 16-formyl-6α-fluoro-19-nor-$\Delta^{4,16}$-androstadien-3-one. |
| 16-methoxymethylene-6α-chloro-3-cycloethylenedioxy-Δ⁵-androsten-17β-ol. | 16-formyl-6α-chloro-$\Delta^{4,16}$-androstadien-3-one. |
| 16-methoxymethylene-6α-chloro-3-cycloethylenedioxy-19-nor-Δ⁵-androsten-17β-ol. | 16-formyl-6α-chloro-19-nor-$\Delta^{4,16}$-androstadien-3-one. |
| 16-methoxymethylene-6α-methyl-3-cycloethylenedioxy-Δ⁵-androsten-17β-ol. | 16-formyl-6α-methyl-$\Delta^{4,16}$-androstadien-3-one. |
| 16-methoxymethylene-6α-methyl-3-cycloethylenedioxy-19-nor-Δ⁵-androsten-17β-ol. | 16-formyl-6α-methyl-19-nor-$\Delta^{4,16}$-androstadien-3-one. |

*Example VII*

A mixture of 500 mg. of 16-formyl-$\Delta^{4,16}$-androstadien-3-one, 10 cc. of dioxane and 350 mg. of 2,3-dichloro-5,6-dicyano-1,4-benzoquinone was refluxed for 10 hours. It was then cooled, the 2,3-dichloro-5,6-dicyano-1,4-benzohydroquinone formed during the reaction filtered off, and the filtrate evaporated to dryness. The residue was dissolved in acetone and filtered through 10 g. of aluminum. Crystallization from acetone-hexane gave 16-formyl-$\Delta^{1,4,16}$-androstatrien-3-one.

Treating by the same procedure 16-formyl-2α-methyl-$\Delta^{4,16}$-androstadien-3-one, 16-formyl-6α-fluoro-$\Delta^{4,16}$-androstadien-3-one, 16-formyl-6α-chloro-$\Delta^{4,16}$-androstadien-3-one, and 6α-methyl-$\Delta^{4,16}$-androstadien-3-one, there were respectively obtained 16-formyl-2α-methyl-$\Delta^{1,4,16}$-androstatrien-3-one, 16-formyl-6α-fluoro-$\Delta^{1,4,16}$-androstatrien-3-one, 16-formyl-6α-chloro-$\Delta^{1,4,16}$-androstatrien-3-one, and 16-formyl-6α-methyl-$\Delta^{1,4,16}$-androstatrien-3-one.

We claim:
1. A compound of the following formula:

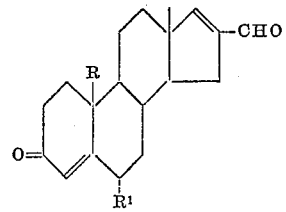

wherein R is a member of the group consisting of hydrogen and methyl; and $R^1$ is selected from the group consisting of fluorine, chlorine and lower alkyl.
2. 16-formyl-6α-fluoro-$\Delta^{4,16}$-androstadien-3-one.
3. 16-formyl-6α-fluoro-19-nor-$\Delta^{4,16}$-androstadien-3-one.
4. 16-formyl-6α-chloro-$\Delta^{4,16}$-androstadien-3-one.
5. 16-formyl-6α-chloro-19-nor-$\Delta^{4,16}$-androstadien-3-one.
6. 16-formyl-6α-methyl-$\Delta^{4,16}$-androstadien-3-one.
7. 16-formyl-6α-methyl-19-nor-$\Delta^{4,16}$-androstadien-3-one.
8. A compound of the following formula:

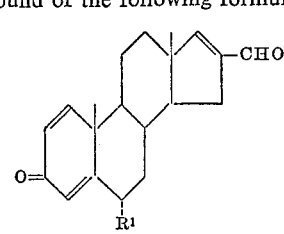

wherein $R^1$ is selected from the group consisting of fluorine, chlorine and lower alkyl.
9. 16-formyl-6α-fluoro-$\Delta^{1,4,16}$-androstatrien-3-one.
10. 16-formyl-6α-chloro-$\Delta^{1,4,16}$-androstatrien-3-one.
11. 16-formyl-6α-methyl-$\Delta^{1,4,16}$-androstatrien-3-one.
12. A compound of the following formula:

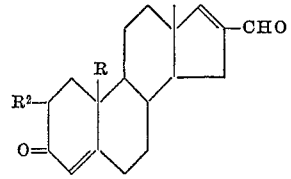

wherein R is selected from the group consisting of hydrogen and methyl; and $R^2$ is a member of the group consisting of hydrogen and lower alkyl.
13. 16-formyl-$\Delta^{4,16}$-androstadien-3-one.
14. 16-formyl-19-nor-$\Delta^{4,16}$-androstadien-3-one.
15. 16-formyl-2α-methyl-$\Delta^{4,16}$-androstadien-3-one.
16. 16-formyl-2α-methyl-19-nor-$\Delta^{4,16}$-androstadien.
17. A compound of the following formula:

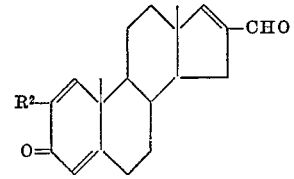

wherein $R^2$ is selected from the group consisting of hydrogen and lower alkyl.
18. 16-formyl-$\Delta^{1,4,16}$-androstatrien-3-one.
19. 16-formyl-2-methyl-$\Delta^{1,4,16}$-androstatrien-3-one.
20. A process for the production of 16-formyl-$\Delta^{16}$-androsten derivatives which comprises treating the corresponding 17-keto compound with ethyl formate in the presence of an alkali metal hydride; hydrolyzing the resulting metal salt in a mild acid medium; methylating the resulting 16-hydroxymethylene-17-keto-androstane with a suitable methylating agent to form the respective 16-methoxymethylene-17-keto-androstane derivative, reducing the keto group of this last mentioned compound with sodium borohydride to the corresponding 16-methoxymethylene-17β-hydroxy-androstane derivative and finally treating this last named compound with a mild acid.

21. The process of claim 20 wherein the alkali metal hydride is sodium hydride, the mild acid medium is aqueous tartaric acid solution, the suitable methylating agent is diazomethane, and the mild acid is 0.04% acetonic hydrochloric acid solution.

No references cited.